(12) United States Patent
Farris

(10) Patent No.: US 7,523,713 B2
(45) Date of Patent: Apr. 28, 2009

(54) USE OF FLOATATION MATERIAL TO SUPPORT A VEHICLE IN WATER

(76) Inventor: Robert Farris, 113 Rodborough Rd., Columbia, SC (US) 29212

( * ) Notice: Subject to any disclaimer, the term of this patent is extended or adjusted under 35 U.S.C. 154(b) by 0 days.

(21) Appl. No.: 11/800,519

(22) Filed: May 7, 2007

(65) Prior Publication Data

US 2008/0276852 A1 Nov. 13, 2008

(51) Int. Cl.
B63B 43/10 (2006.01)
(52) U.S. Cl. ....................................................... 114/68
(58) Field of Classification Search .................. 114/68, 114/69, 360; 440/12.5
See application file for complete search history.

(56) References Cited

U.S. PATENT DOCUMENTS 5,291,846 A * 3/1994 Davis, Jr. ..................... 114/344
5,868,093 A * 2/1999 Tseng ......................... 440/12.5

* cited by examiner

Primary Examiner—Stephen Avila

(57) ABSTRACT

This invention gives the directions for the design and building of a vehicle which will be supported in water by the installation of a Floatation Material. The design is so that the vehicle, occupants, and cargo will be supported so that the vehicle will come to rest in the upright position and with the water level below the upper torso of the occupants. There are several demonstrations presented on a regular basis which show how to escape from a vehicle that has suddenly become immersed in water: a lake, river, etc. Escaping is portrayed as a fairly simple procedure when performed by someone who is coached through the process, and by an individual who knows the vehicle is supported by a crane. The design presented in this invention provides a vehicle that will float while requiring no effort from the occupants, nor does it depend on the performance of some mechanism, i.e. switches, relays, or some mechanically activated procedure that requires intervention by the occupant. Several options were considered and examined before the design presented in this invention was chosen as the best, and safest. There have been designs using inflatable objects. The inflatable object approach has several shortcomings. The most obvious is that the vehicle may not assume the upright position. The material-supported vehicle design presented in this invention, when implemented, will generate a vehicle that will end up in the top-up position when placed in deep water. If the vehicle goes into the water top first, the vehicle will quickly correct to the top-up position.

1 Claim, 4 Drawing Sheets

USE OF FLOATATION MATERIAL TO SUPPORT A VEHICLE IN WATER

CROSS REFERENCES

I have searched through over 100 patents and have found only one patent that even addresses the situation where a vehicle is immersed in water. Several of the patents address how to prepare to float a vehicle when flood waters are expected to arrive. In these flood situations, the patent is directed toward providing floatation devices that are to be attached to the vehicle.

The one patent (U.S. Pat. No. 6,881,108) uses sensors, switches, and other devices that require activation. These devices may not work when immersed in water. In U.S. Pat. No. 6,881,108, inflatable devices located in the wheel areas are used to support the vehicle.

In U.S. Pat. No. 6,881,108 the subject is not address as to what happens if the vehicle is thrust into the water in an inverted position.

My invention uses a floatation material installed throughout the body of the vehicle to assure that the vehicle will assume the top-up position under all circumstances. My invention also requires no participation on the behalf of the occupant(s) and does not rely on the functioning of any mechanical devices.

My search effort has not uncovered any patent that provides the capability to make a vehicle float in the top-up position.

FEDERALLY SPONSORED RESEARCH OR DEVELOPMENT

Not Applicable

REFERENCE TO SEQUENCE LISTING

Not Applicable

BACKGROUND OF THE INVENTION

This invention lies in the field of how to rescue occupants from a vehicle that has suddenly been immersed in water. There are several deaths caused when passengers are trapped in a submerged vehicle. This invention addresses the problem of surviving in a vehicle that has suddenly been placed in a body of water. Escaping from a vehicle residing in water is becoming more of a concern as evidenced by the frequent presentations given on how to escape from a vehicle that has plunged into water. More recently the public has been made more aware of the difficulty of trying to escape from the vehicle. The emphasis has been placed on how difficult (impossible) one finds it is to open a vehicle door that is being held by the force caused by the pressure generated by just a few inches of water. The information presented in the demonstrations shows how to release the seat belt, use a special device to break a window, position oneself correctly to exit the vehicle.

During the presentations the information given does not emphasize the difficulties one will encounter when trying to go through the required sequence of steps to facilitate the escape. For starters, anyone thrown into the situation will be in the panic state. Another drawback is that of having the necessary tool(s) and knowing how to use the tool. Another issue that is not shown in the demonstrations is that of removing a small child. And still another is how does one cope with the fact that you will be in deep water if and when you exit the vehicle.

In addressing these predicaments, the inventor examined several options, all of which rely on occupant intervention and/or the performance of a mechanical device. One option considered was that of having a very quickly removable roof. Not easy to do and a major design problem. Another is that of using inflatable devices. If the device inflates inside the vehicle, there exists the possibility of injury to the occupants, as well as how to provide enough floatation, and provide lift that will put the vehicle in the top-up position.

Another option considered is that of providing breathing apparatus that one can use while trying to escape from the vehicle. This method has many drawbacks. An apparatus would be needed for each occupant. One must exit the vehicle in a timely manner, and still face the deep water and swim to safety.

Upon consideration of these options and others, a passive floatation material providing the necessary lift to support the vehicle is the best solution. This invention provides a passive system which will put the vehicle in the top-up position, and with the occupants resting with their upper torso above water allowing the occupants to stay in the vehicle until the next step is established and rescue is performed.

This invention describes how a person qualified in the field can easily design a vehicle or modify a design so the resulting vehicle will meet the requirements specified in this invention. When one considers the buoyancy provided by the vehicle, occupants, and cargo, then floatation material can be placed in the spaces under the hood, trunk lid, and below the passenger compartment. The drawings and the explanation of the drawings give the approach to be used in the design. Every void now in presents designs should be examined as places to install the floatation material. Using the existing spaces will lessen the amount of support that must be supplied by the material under the hood, trunk lid, and below the passenger compartment.

DETAILED DESCRIPTION OF THE INVENTION

Drawings

Eight drawings are used to show the concept of the invention. A brief description of the eight drawings is given followed by a detailed description.

FIG. 1a Shows a sectional front view of FIG. 1.

FIG. 2a Shows a sectional front view of FIG. 2.

FIG. 1b Shows a sectional rear view of FIG. 1.

FIG. 2b Shows a sectional rear view of FIG. 2.

FIG. 1c Shows the view of the section C identified in FIG. 1.

FIG. 2c Shows the view of the section C identified in FIG. 2.

Figure 1:
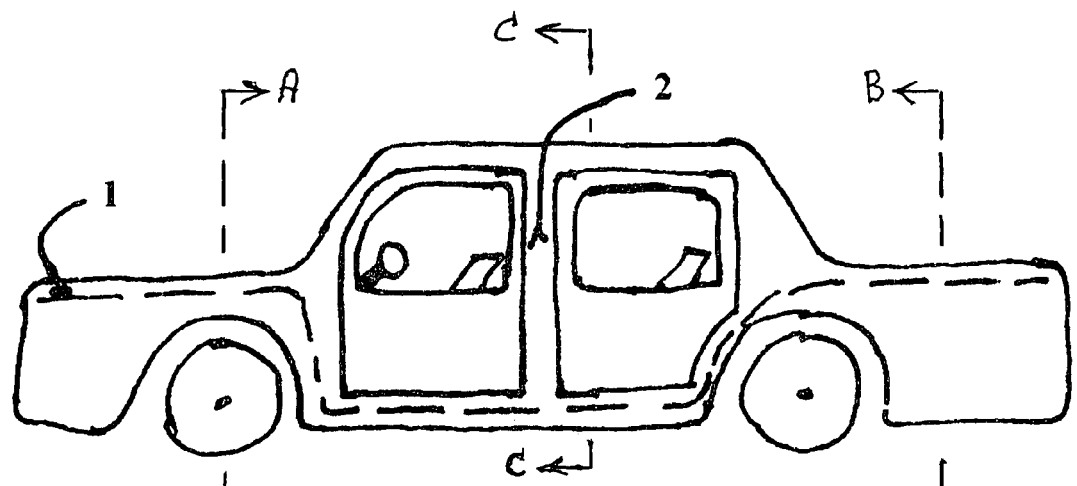
FIG. 1 Shows the profile of a typical vehicle before the material is installed.

FIG. 1 shows a typical vehicle that may be built or how an existing vehicle can be modified to include floatation material (referred to a material throughout the text) to make the vehicle float when immersed in water. The premise presented in this invention is that the drive train of the vehicle can essentially remain the same. The body of the vehicle will be modified to accommodate the addition of the material. Material will be attached to the under surface of the hood and trunk lid of the vehicle, enough material to provide the larger portion of the floatation capability. Another portion of the material will be installed between the under side of the passenger compartment (2) and the floor of the vehicle. The passenger compartment will be raised the same amount as the hood is raised so the driver resides in the same surroundings as that of the unmodified vehicle. The dotted line (1) in FIG. 1 identifies the portion of the body of the vehicle that will be raised to allow for the installation of the material. Material will be attached to the underside of the hood and trunk lid. Additional material will be placed under the passenger compartment. Amounts of material to be installed in these three locations will be determined by design parameters for each particular vehicle. The ratio of the floatation provided above the center of mass and that provided below the center of mass must be adjusted to assure that the combined center of flotation is above the combined center of mass; consisting of the vehicle, passengers, and cargo.

As the final design is concluded, every existing void in the body of the vehicle will be considered as a place to install the material. This will give lift in several places that were not used as candidates when calculations were performed to determine the feasibility of providing enough support to float the vehicle.

A totally new design can be produced using the drive trains presently on the drawing board. The intention of this invention is to show the feasibility of making a vehicle that will float, whether including the floatation capability in a present design or designing a new body that will accommodate the floatation material.

Figure 2:
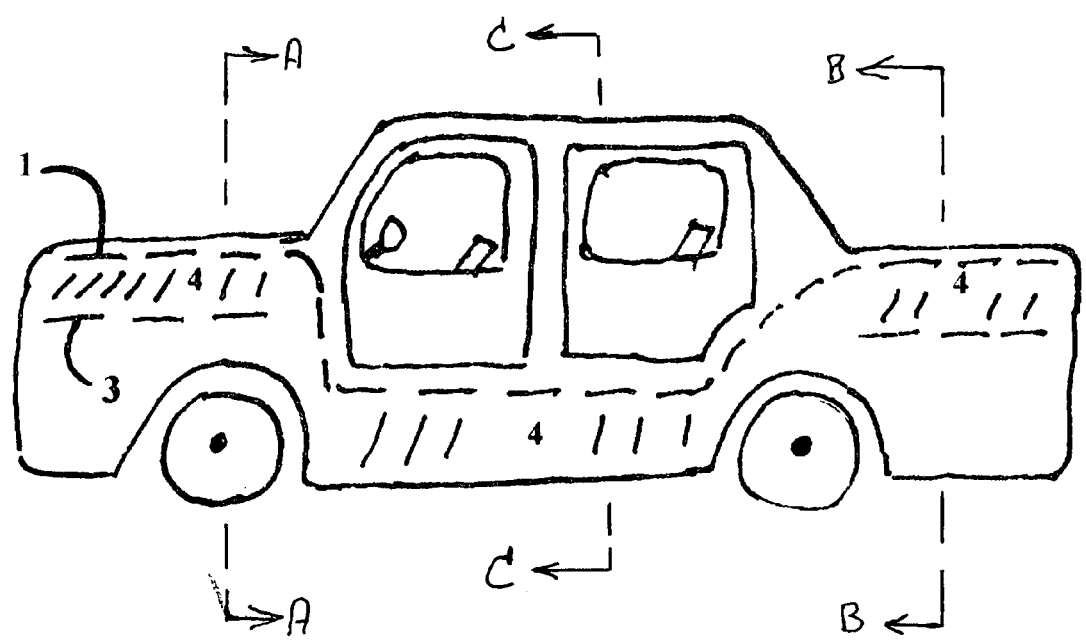
FIG. 2 Shows the profile of a typical vehicle after the material is installed.
Figures 1, 2:
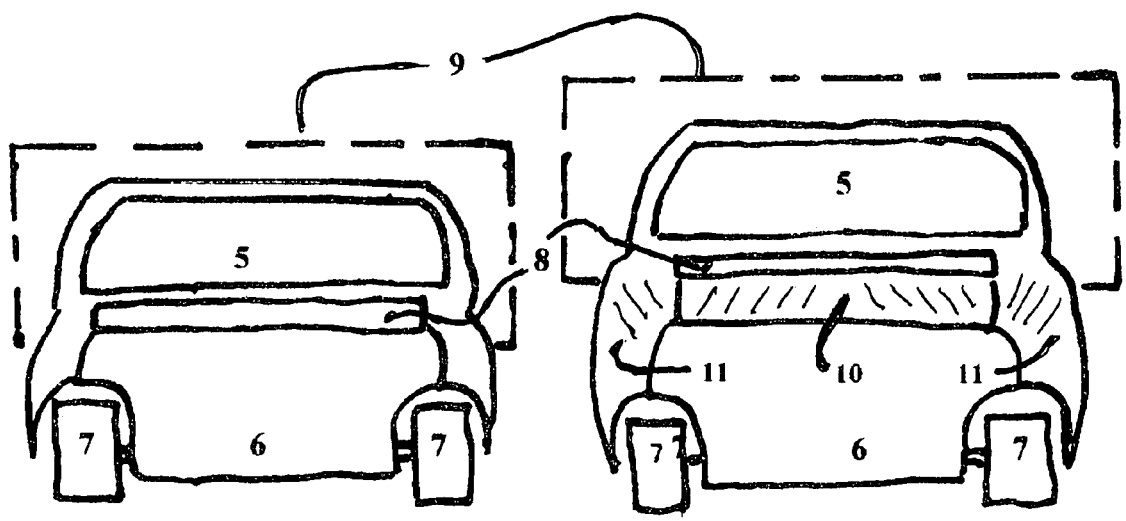
Figures 1, 2:
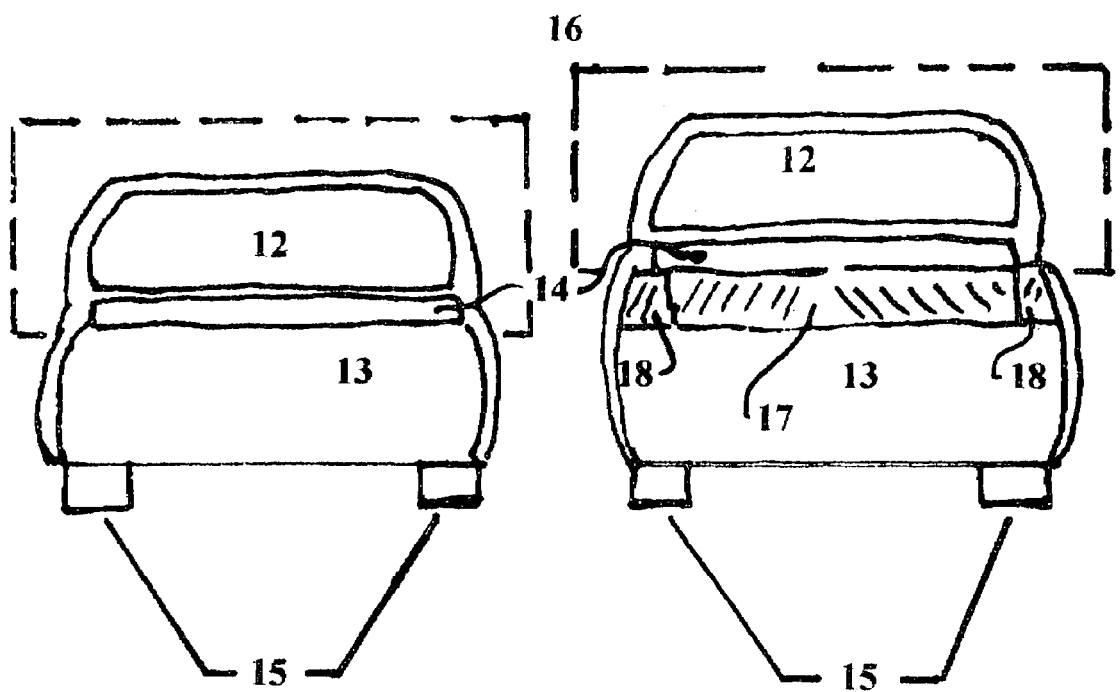
Figures 1, 2:
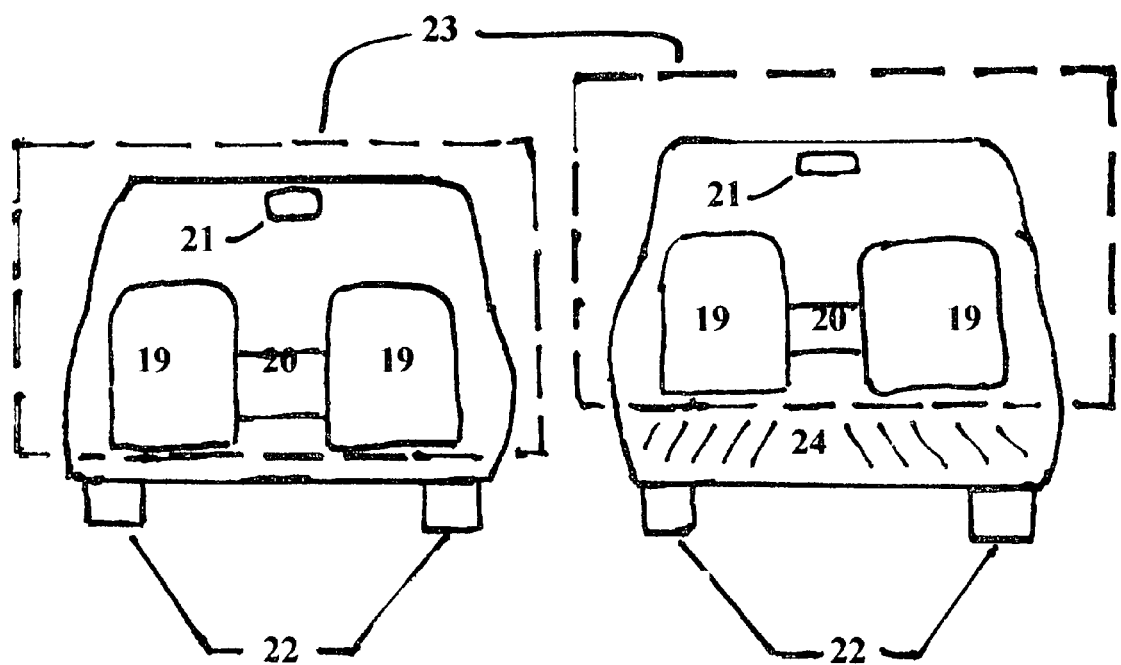

FIG. 2 shows a conceptual design of a vehicle where the body of the vehicle has been modified to accommodate the material. The dotted line (1) in FIG. 2 identifies the portion of the body that has been raised. The dotted line (3) shows the position of the body before being raised. In FIG. 2, (4) identifies the places that are filled with the floatation material. The placement of the material is not dictated by the conceptual configuration shown in FIG. 2, but the vision in FIG. 2 is to convey a suggested profile. As long as the proper amount of lift can be provided, and the material positioned to assure that the vehicle will float in the top-up position, then the intent of the invention is accomplished.

FIG. 1a gives a view at section A looking toward the back of the vehicle. The cut away picture shows the passenger compartment (5), the engine compartment (6), wheels (7), and the hood (8). The dotted line (9) identifies that portion of the vehicle that is to be raised.

FIG. 2a gives the corresponding view showing the profile after the floatation material has been installed. As shown, the material (10) is attached to the hood (8), and material is added in the sections where the body has been extended (11).

FIG. 1b gives a view shown at section B looking forward. This view shows how one may see the vehicle. The sectional view shows the passenger compartment (12), the trunk compartment (13), the wheels, (15), and the trunk lid (14). The dotted line (16) marks the portion of the vehicle that must be raised. The material will be attached to the under side of the trunk lid (14).

FIG. 2b gives the corresponding view as seen at section B after the material (17) is attached to the trunk lid (14). Material (18) is placed in the spaces provided by the extended body.

FIG. 1c is the view of the center of the vehicle as seen looking forward at section C. The tires (22), seats (19), arm rests (20), and mirror (21) are identified as how one may observe the section looking forward. The dotted line (23) identifies the portion of the vehicle that must be raised to accommodate the installation of the floatation material.

FIG. 2c gives the corresponding view at the center of the vehicle after the material (24) has been installed.

The amount of material installed will be dictated by the weight of the vehicle. The amount of material that must be installed under the hood, under the trunk lid, and under the passenger compartment, will be influenced by several factors. Possibilities exist that other parts of the vehicle can be used; existing voids, and seats, as possibilities. The tires will provide lift. The bottom line of the invention is to install enough floatation material to support the weight of the vehicle and to assure that the vehicle will float in the top-up position and assure that, the water line will rest below the upper torso of the occupants. Each vehicle will have to be designed to accommodate the floatation material and accomplish the safety feature as specified in this invention.

The passenger compartment is raised the same amount as the hood of the vehicle is raised to assure that the driver is positioned in the same surroundings in an unmodified or a modified vehicle. The amount of lift must be adjusted to assure the greater lift is provided above the center of mass. The design will be tailored to accommodate each particular vehicle design.

There are several pockets of space that now exist in present designs which can be used to house the material. Using the available spaces will enable adjustments to be made as to how much material must be installed below the hood, trunk lid, and above the floor. Another factor that is that of how much buoyancy is provided by the vehicle, passengers, and cargo. When the buoyancy factor is combined with the use of existing vacant spaces in the present designs, the floatation burden borne by the floatation material installed under the hood, trunk lid, and between the floor and the raised passenger compartment, will be lessened.

The possibility of installing floatation capability in the roof of the vehicle can be investigated. Obviously material installed in the roof will not contribute to the final desired result, but the lift provided by the roof will accelerate the process of rotating a vehicle to the top-up position when the car is placed in the water in the top-down position.

A side benefit provided by the material may be that of providing insulation and noise reduction. These two items are not the main consideration of this invention.

SUMMARY OF THE INVENTION

This invention will enable a vehicle to come to rest in the top-up position in water with the upper torso of the occupants above the water level. The vehicle will be rotated to the top-up position based on the fact that the center of lift provided by the floatation material will reside above the combined center of mass of the vehicle, passengers, and cargo. The floatation material provides a passive tool which functions with no effort required by the occupants or the functioning of mechanical devices. The floatation material will provide the service even though the vehicle has been damaged by a collision that has left the vehicle in a somewhat damaged, but not destroyed, condition.

Calculations have been performed using several models of vehicles with four passengers and a reasonable amount of cargo (luggage). a one thousand pound load. The calculations show that the vehicle can be modified to perform as required and still maintain the same basic profile of the vehicle. The height of the vehicle must be raised to allow for the inclusion of the floatation material. The final design will allow for floatation material to be placed in voids in the vehicle which were not considered in these preliminary calculations.

I claim:

1. A method of improved vehicle safety by modifying a vehicle to include floatation material to make the vehicle float in a top side up position when immersed in water including, a vehicle having a drive train including an engine, having a floor, having a front hood over the engine, a passenger compartment with seats, fender wells with voids and a trunk with a trunk lid, the vehicle having a center of lift and a center of mass, the center of mass including the vehicle weight, cargo and passengers, the passenger compartment being above the floor, the front hood, passenger compartment, and trunk lid are all raised by the same height with respect to the drive train which remains unchanged, floatation material, the same height that the vehicle front hood, passenger compartment and trunk lid are raised, is attached to the underside of the front hood, attached below the seats and the passenger compartment but above the floor, and attached to the underside of the trunk lid, floatation material is also attached to and fills the voids in the fender wells, all of the floatation material adds enough buoyancy to cause the vehicle to float when immersed with the waterline being below a passenger's upper torso and with all of the floatation material being placed to change the vehicle center of lift to be above the vehicle center of mass to cause the vehicle to be in a top up position when immersed in water, all of the floatation material also providing sound reduction and insulation to the passenger compartment.

* * * * *